April 24, 1951  W. C. ROUSE ET AL  2,550,087
LAUNCHING AND LOWERING GEAR
Filed Oct. 15, 1945  6 Sheets-Sheet 1
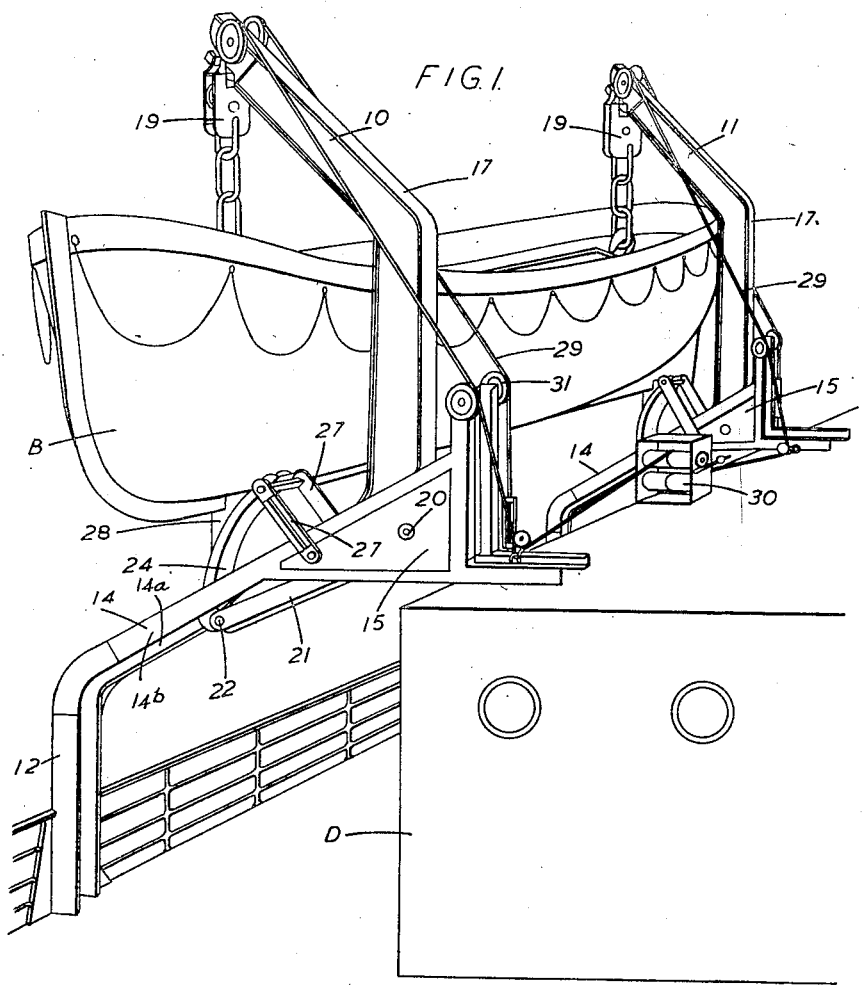

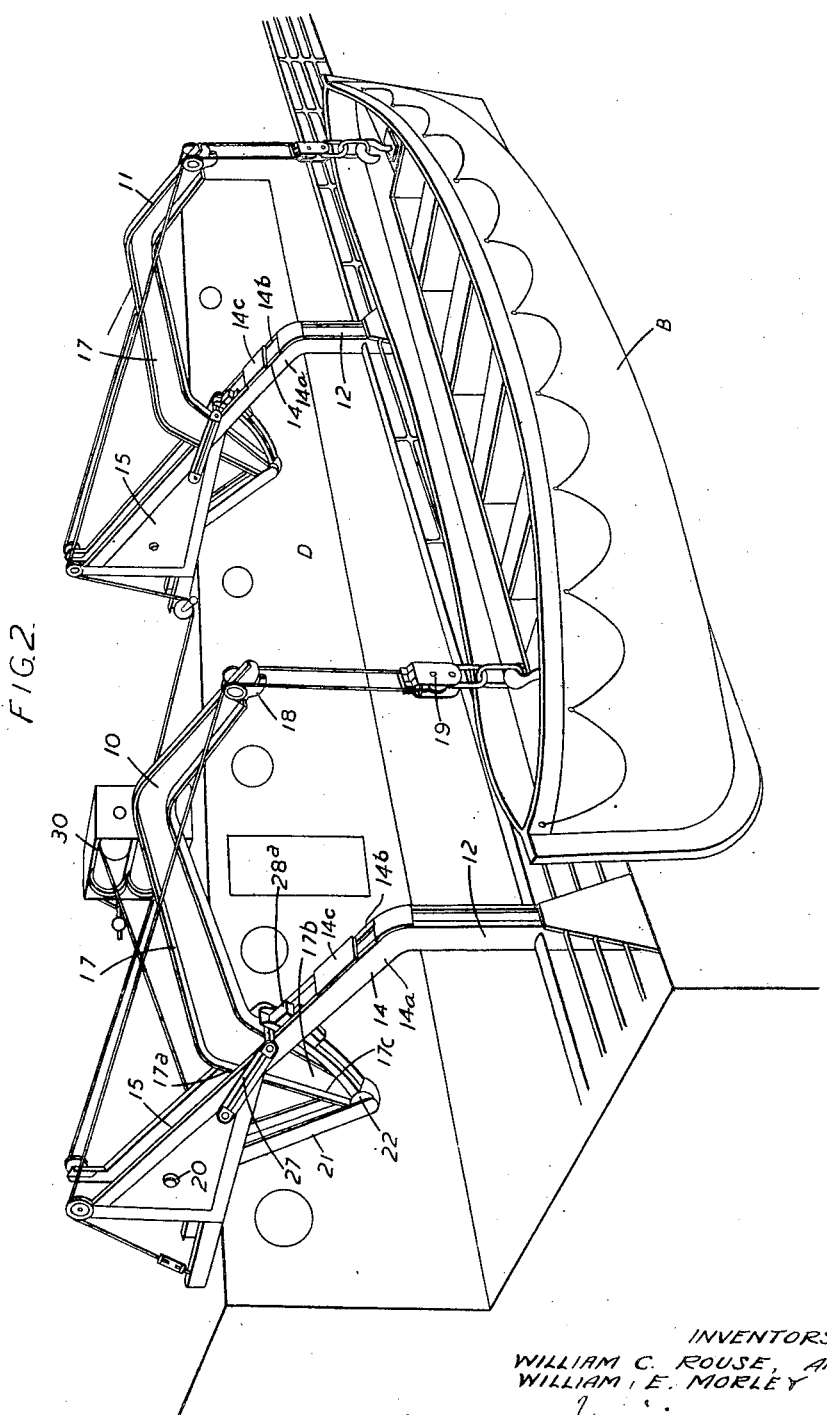

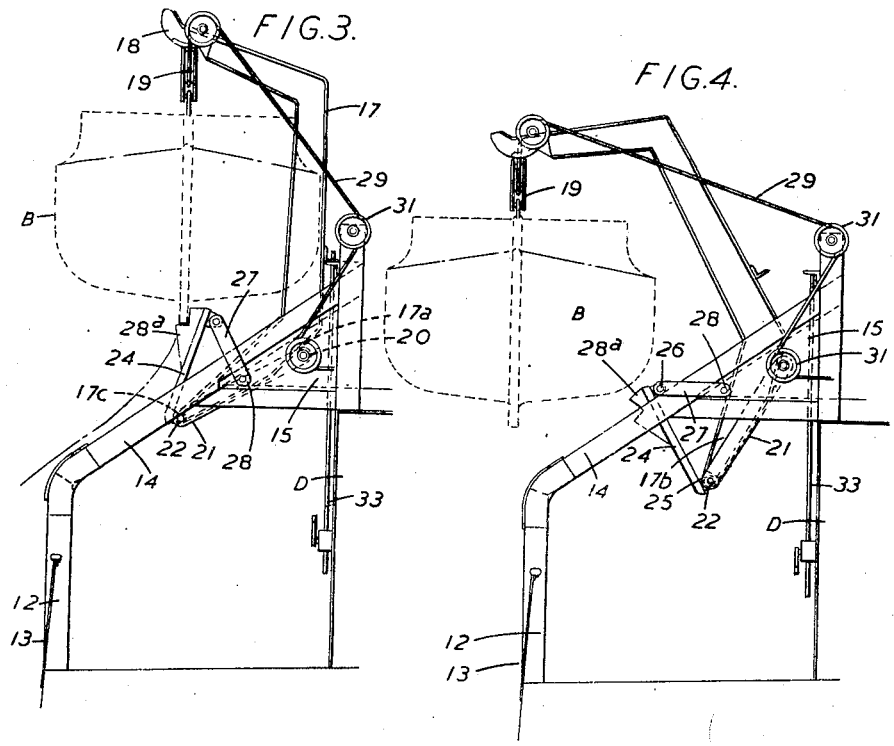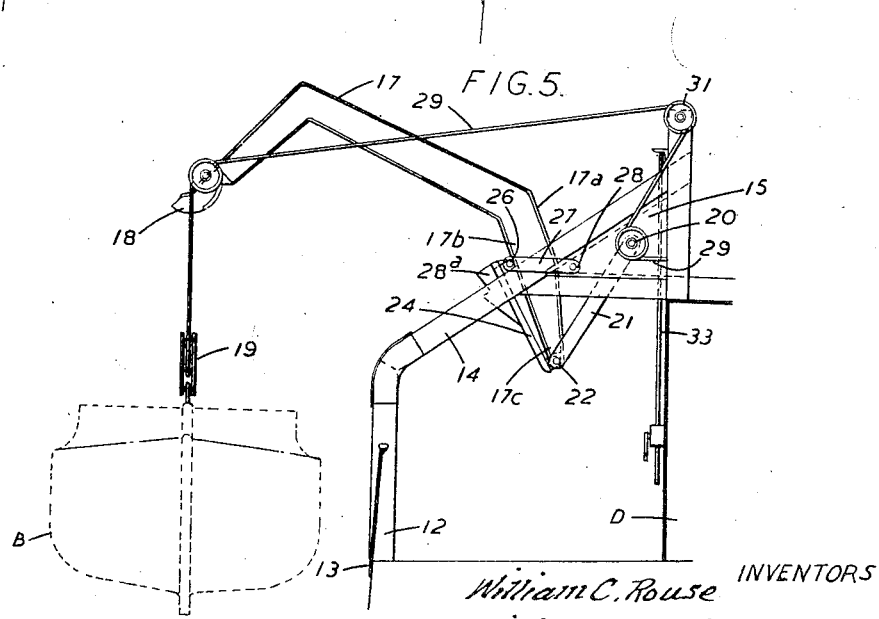

April 24, 1951     W. C. ROUSE ET AL     2,550,087
LAUNCHING AND LOWERING GEAR
Filed Oct. 15, 1945     6 Sheets-Sheet 5
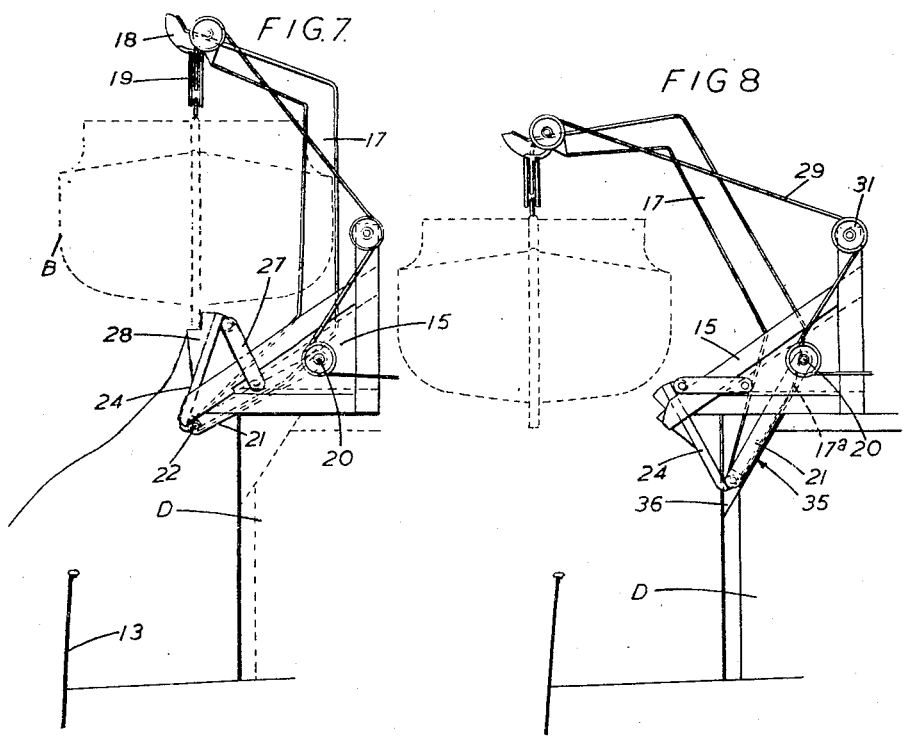
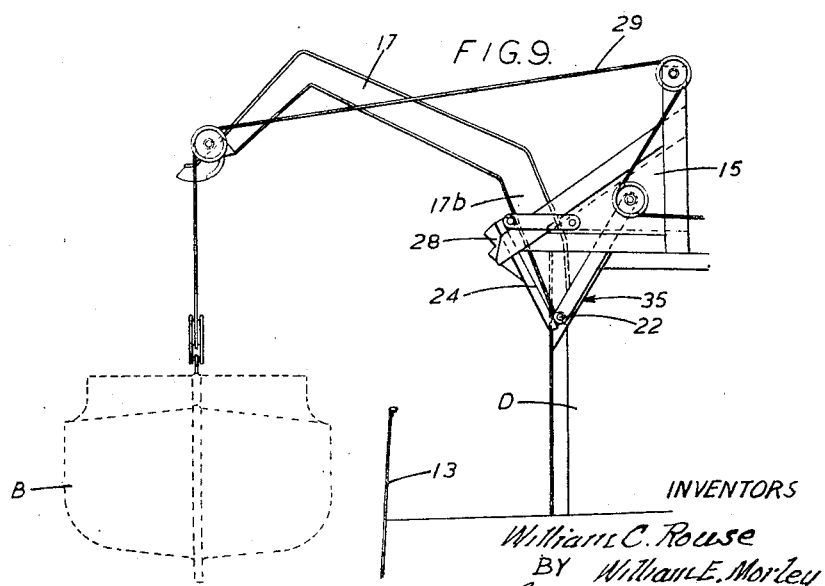

April 24, 1951     W. C. ROUSE ET AL     2,550,087
LAUNCHING AND LOWERING GEAR
Filed Oct. 15, 1945     6 Sheets-Sheet 6
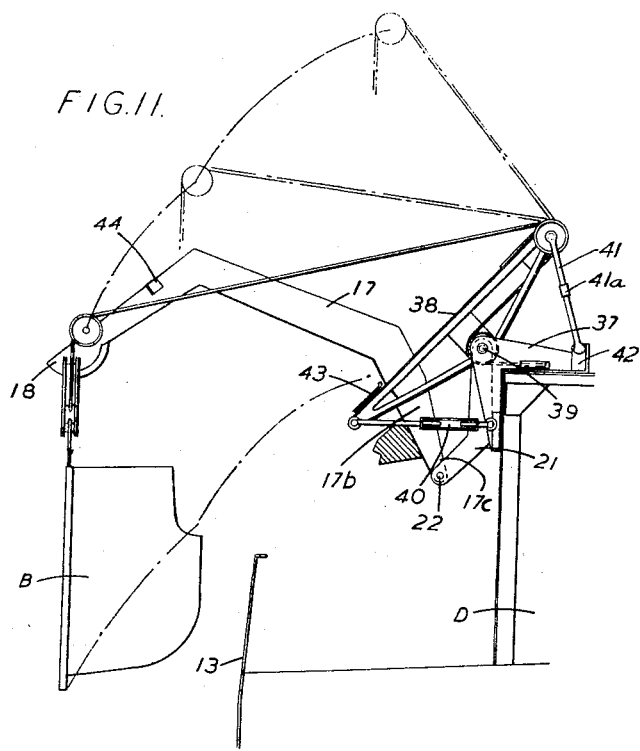
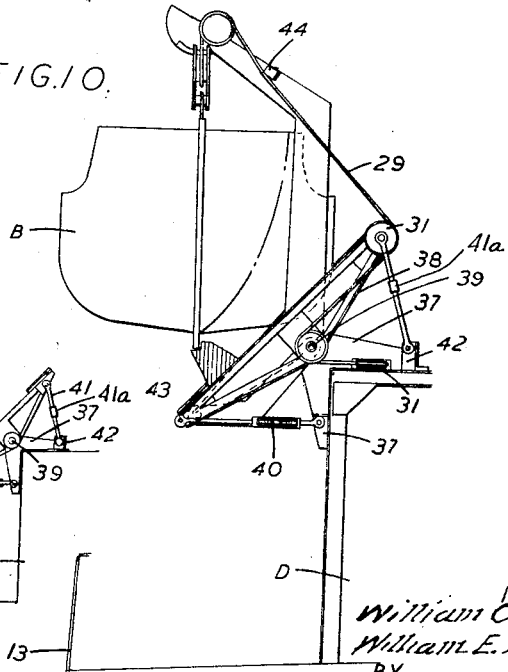
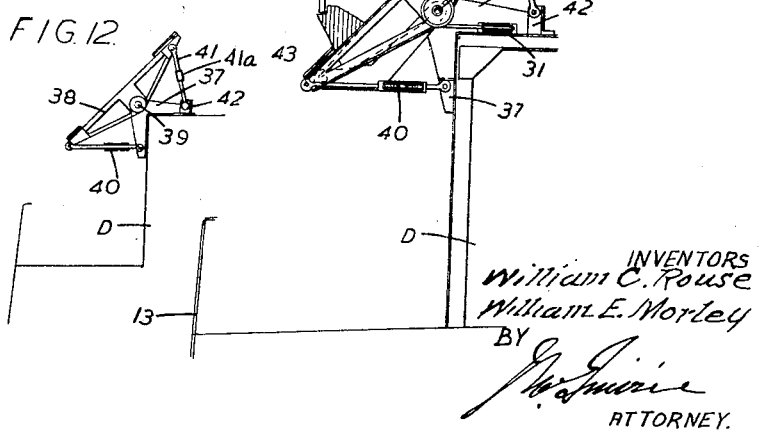

Patented Apr. 24, 1951

2,550,087

UNITED STATES PATENT OFFICE 2,550,087

LAUNCHING AND LOWERING GEAR

William Cameron Rouse, Birkdale, and William Edward Morley, Gillingham, England

Application October 15, 1945, Serial No. 622,252
In Great Britain October 23, 1944

8 Claims. (Cl. 9—38)

1

This invention is for improvements in or relating to launching and lowering gear (e. g. lowering gear for ship's lifeboats). The invention is particularly concerned with improvements in ship's gravity davits of the kind having a multiple pivot arrangement for the davit arm, i. e. of the kind in which there are at least two pivots about which the davit arm swings outboard successively.

Gravity davits of this kind have the advantage that whilst they occupy a relatively small amount of deck space and head room they have a comparatively long outboard reach. A further advantage is that the davit tends to lower the boat steadily over the full range of davit movement and this helps towards a proper control of the whole boat launching operation.

In davits of practical construction (i. e. the davits must be capable of successfully launching a boat against an adverse angle of heel of 15°–20°) and of the multiple pivot kind as constructed heretofore, the davit arm has been arranged to swing into engagement with each succeeding pivot, the pivots being located in the path of movement of a pivoting part of the davit and it is by no means certain, particularly under icing conditions that the davit will in fact find and engage correctly with the said pivots. One object of the present invention is to eliminate this defect in gravity davits of the multiple pivot kind having at least two pivots for the davit arm, by providing a davit in which the second pivot is in permanent engagement with the davit arm, the said second pivot moving with the davit arm until arrested by a stop at the second pivoting position of the said arm. This construction also permits enclosed and well lubricated bearings to be employed for the pivots.

A further object of the invention is to provide a gravity davit of the multiple pivot kind having at least two pivots for the davit arm, the second of which is permanently connected to the davit arm and is carried by a linkage connected to the davit stand and in which the weight of said linkage is arranged to bias the davit arm outboard. This is important because if said linkage has an inboard bias then when the davit arm is relieved of the weight of the boat the arm may kick back on its pivot and be damaged and should the davit arm swing right back to the extreme inboard or stowed position the greatest difficulty will be experienced in recovering the boat.

The invention will be further described by way of example as applied to launching gear for a ship's lifeboat, with reference to the accompanying drawings.

On the drawings:

Figure 1 is a perspective view of one embodiment of launching gear, for a ship's lifeboat, comprising a pair of gravity davits, the gear being shown with the boat in the inboard or stowed position.

Figure 2 is a further perspective view of the launching gear shown in Figure 1, but with the davit arms in the fully outboard position.

Figure 3 is a side elevation of the launching gear shown in Figure 1 and with the davit arms in the fully inboard position.

Figure 4 is a side elevation of the launching gear shown in Figure 1 but with the davit arms moved outboard to the second pivoting position.

Figure 5 is a side elevation of the launching gear shown in Figure 1 but with the davit arms in the fully outboard position.

Figure 7 is a side elevation of a slightly modified form of the launching gear shown in Figure 1, the davit arms being shown in the fully inboard position.

Figure 8 is a side elevation of the launching gear shown in Figure 7 but with the davit arms moved outboard to the second pivoting position.

Figure 9 is a side elevation of the launching gear shown in Figure 7 but with the davit arms in the fully outboard position.

Figure 10 is a side elevation of a further embodiment of launching gear, according to the invention, the davit arms being shown in the fully inboard position.

Figure 11 is a side elevation of the launching gear shown in Figure 10 but with the davit arms in the fully outboard position, and Figure 12 is a detail side elevation, to a reduced scale, of a fitting forming part of the launching gear shown in Figures 10 and 11.

Figure 6:
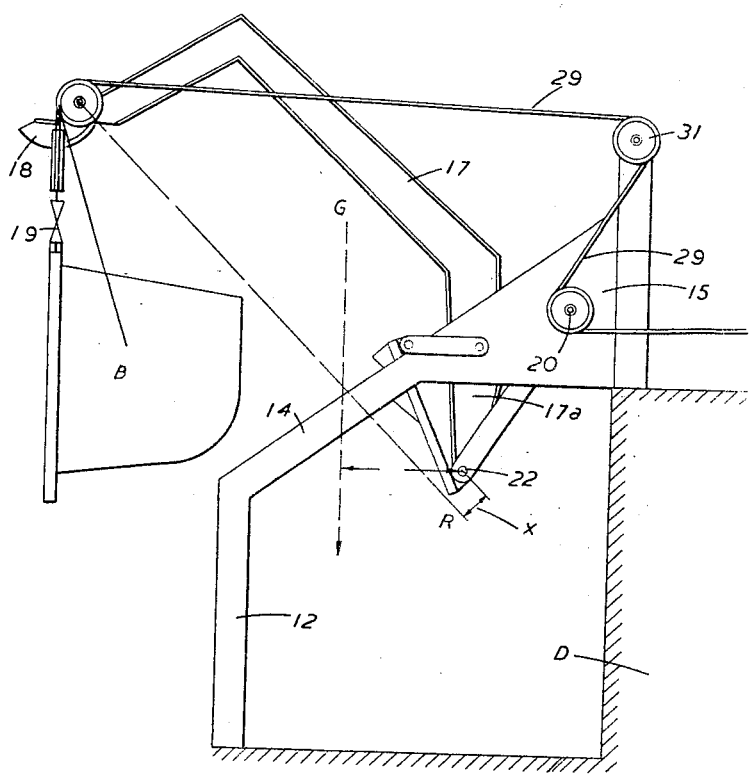
Figure 6 is a force diagram showing how certain movable parts of the davit mechanism are arranged to assist and maintain outboard positioning of the davit arm.

The launching gear shown in Figures 1 to 5 comprises a pair of gravity davits 10 and 11 which are of identical construction so that it will only be necessary to describe one in detail. Each davit comprising a supporting stand having a leg member 12 located at the ship's side 13, an inclined part 14 and a rear supporting structure 15 secured on the deck house D. The inclined part 14 of the stand comprises a pair of spaced apart members 14a and 14b bound together by a surface plate 14c (see Fig. 2) and the davit arm 17 is located between said members which provide the arm with substantial lateral support. The davit arm is of C-like shape and carries the usual horn 18 and pulley 19, of the lowering tackle, at its upper part. A fulcrum-rest 20 (the first operating fulcrum for the davit arm) is secured in the part 15 of the stand and in the stowed position the heel 17a of the foot part 17b of the davit arm rests on this fulcrum as shown in Figure 3. A link 21 is pivotally connected by a pivot pin 22 (the second operating pivot for the davit arm) to the toe 17c of the davit arm and the other end of the link 21 is pivotally connected to the fulcrum 20. It will be noted that in the stowed position the link 21 lies approximately parallel with the cranked or foot part 17b of the davit arm. A keel supporting link 24, which for lateral support is also located between the members 14a and 14b forming the part 14 of the stand, is coupled to the pivot pin 22 as indicated at 25 (Figure 4), the opposite end of the link 24 being connected at 26 to a stop link 27 anchored at 28 to the davit stand and in two parts which embrace the stand between them. The link 24 carries a keel-rest or choke 28a. The wire falls 29 from the winch 30 are led via pulleys 31 on the davit stand to the fall block lowering tackle 19. A hand operatable bolt 33 is provided for locking the davit arm in the stowed position.

To launch the boat B from the stowed position shown in Figures 1 and 3, the bolt 33 is first released and the fall ropes are then payed out from the winch in the usual way. Initially the davit arm rocks outboard about its first fulcrum 20 carrying the linkage 21, 24, and 27 downwardly until further movement of the linkage is prevented by the horizontal positioning of the stop link 27 and the engagement thereof with the part 14 of the stand. This condition of the mechanism is shown in Figure 4. During this initial movement of the davit arm the boat is positively dislodged and pushed outboard by the keel-rest or chock 28a due to the movement of the keel supporting link 24. The davit arm completes its outboard movement from the position shown in Figure 4 to the position shown in Figure 5, about the second pivot 22, the davit arm being arrested at the final outboard position by the engagement of its foot part 17b with the pivot pin 26. It will be noted, particularly with reference to Figure 6, that the centre of gravity G of the davit arm and its associated linkage in the second pivoting position lies well outboard of the pivot about which the arm is required to move. It has been found in practice that the davit arms will move outboard even if the ship on which they are fitted has an adverse list or angle of heel of as much as 20°. Furthermore, this outboard biasing of the davit arm is particularly important when the boat becomes waterborne and the davit arm is relieved of the weight thereof. Under such conditions were it not for the outboard positioning of the centre of gravity as just described the davit arm would swing back to the stowed position. In a rough sea there would be a constant oscillation of the davit arm on its stand with resulting damage to the davit structure. Furthermore, even when the boat has been cast-off it is important that the davit arms should remain outboard ready to recover the boat and bring it back to the stowed position. In this connection we wish to emphasise that the weight of the linkage 21, 24, 27 is arranged particularly to assist outboard movement of the davit arm during the initial outboard movement and prevent any tendency for said arm to kick back when relieved of the weight of the boat, or when the boat leaves the horn 18. It should also be noted that as the block 19 swings free of the horn 18 the resultant force R due to the forces acting on the davit head through the wire falls 29 is outboard of the second pivot 22 by the distance X (see Figure 6) to ensure the required outboard movement of the davit arm.

The embodiment of the invention shown in Figures 7, 8 and 9 is similar to that described with reference to Figures 1 to 5 and where applicable like reference numerals have been used to designate like parts. In this embodiment of the invention, however, the davit stand consists of the part 15 only which is mounted wholly on the deck house D, and downward movement of the linkage 21, 24 at the second pivoting position for the davit arm, is limited by the engagement of the link 21 with an abutment 35 in a recessed part 36 of the deck house.

In the embodiment of the invention shown in Figures 10, 11 and 12 each davit is adapted to be supplied as a unit complete with a relatively small supporting stand adapted to be mounted on a deck house D or the like. The stand, which is shown without the davit arm in position in Figure 12, comprises a mounting bracket 37 adapted to be secured to the deck house and a frame 38 adjustably mounted on the bracket 37 by a hinge pin 39 which also constitutes the first fulcrum for the davit arm. In erecting the stand the angle of the frame 38 is adjusted by means of a bottle screw 40 to suit the required outreach of the davit arm 17 in relation to the ship's side 13. A bifurcated tie-rod 41 secured between the upper end of the frame 38 and a bracket 42 on the mounting bracket 37 helps to ensure the rigidity of the frame. The length of this tie bar may be adjusted by means of a bottle screw or turn-buckle 41a. The toe 17c of the davit is pivoted by a pivot pin 22 on the end of a cranked link 21 pivoted on the fulcrum 39 and downward movement of this link at the second pivoting position for the davit arm is limited by engagement of the link with the side of the deck house as shown in Figure 11. Final outboard movement of the davit is limited by the engagement of the foot part 17b with a stop 43 on the forward part of the frame 38. The frame 38 is in two side-by-side parts between which the davit arm 17 moves, the said parts providing good lateral support for the arm. The operation of this embodiment is very similar to that described in detail with reference to Figures 1 to 5.

The chain lines in Figure 11 indicate the approximate path of movement of the davit head and boat, and it will be noted that this tends towards a very flat curve which ensures a steady movement of the davit arm from the stowed to the full outboard position.

A braking element in the form of a projection 44 on the davit arm (see Figure 10) may be arranged to engage frictionally with the fall rope 29 to prevent the fall rope running out too freely when the davit arm is being let outboard. This assists initial control of the outboard movement of the arm by means of the fall ropes.

The links 21 and 24 may comprise bottle screws turnbuckles or the like so that they can be adjusted in length when the davit structure is installed.

We claim:

1. A davit comprising a stand, a davit arm having a foot at its lower part, a fulcrum-rest on the stand for the heel of said foot, a link having one of its ends pivotally connected to the stand substantially concentric with said fulcrum-rest and having its other end pivotally connected to the toe of said foot, a keel-supporting link having one of its ends pivotally connected to the toe of said foot, a stop link having one of its ends pivotally connected to the other end of said keel-supporting link and its other end pivotally connected to the stand, said stop link embracing a part of the davit frame whereby it will interlock therewith to limit movement of the first mentioned link and having a part located in the path of movement of the davit arm to limit outboard movement thereof, and a keel rest on said keel-supporting link.

2. A davit comprising a stand including a mounting bracket, an angularly adjustable frame pivoted on said bracket and means for adjusting and securing the frame in its position of adjustment on the bracket, a davit arm, a first fulcrum-rest on the stand for the davit arm, a link having one of its ends pivotally connected to the stand and having its other end pivotally connected to the davit arm to provide a second pivotal support therefor which is outboard of the first pivotal support, stop means on the stand to limit movement of the link by the davit arm at the operating position of the second pivotal support for the arm and stop means on the frame to limit movement of the davit arm about said second pivotal support.

3. A davit comprising a stand including a mounting bracket, an angularly adjustable frame pivoted on said bracket, means for adjusting the frame on the bracket and a tie-rod for connecting the rear of the frame to the bracket to maintain the frame in its position of adjustment, a davit arm, a first fulcrum-rest on the stand for the davit arm, a link having one of its ends pivotally connected to the stand and having its other end pivotally connected to the davit arm to provide a second pivotal support therefor which is outboard of the first pivotal support, stop means on the stand to limit movement of the link by the davit arm at the operating position of the second pivotal support for the arm and stop means on the frame to limit movement of the davit arm about said second pivotal support.

4. A davit comprising a stand including a mounting bracket, an angularly adjustable frame pivoted on said bracket and means for adjusting and securing the frame in its position of adjustment on the bracket, a davit arm having a foot at its lower part, a fulcrum-rest on the stand for the heel of said foot, a link having one of its ends pivotally connected to the stand substantially concentric with said fulcrum-rest and having its other end pivotally connected to the toe of said foot, stop means on the stand to limit movement of the link by the davit arm when the latter is moved about its fulcrum-rest on the stand and stop means on the frame to limit subsequent movement of the davit arm about its pivotal support on the link and off the fulcrum-rest on the stand.

5. A davit comprising a stand including a mounting bracket, an angularly adjustable frame pivoted on said bracket, means for adjusting said frame on the bracket and a tie-rod for connecting the rear of the frame to the bracket to maintain the frame in its position of adjustment, a davit arm having a foot at its lower part, a fulcrum-rest on the stand for the heel of said foot, a link having one of its ends pivotally connected to the stand substantially concentric with said fulcrum-rest and having its other end pivotally connected to the toe of said foot, stop means on the stand to limit movement of the link by the davit arm when the latter is moved about its fulcrum-rest on the stand and stop means on the frame to limit subsequent movement of the davit arm about its pivotal support on the link and off the fulcrum-rest on the stand.

6. A davit comprising a stand, a davit arm, a first fulcrum-rest on the stand for the davit arm, a link having one of its ends pivotally connected to the stand and having its other end pivotally connected to the davit arm to provide a second pivotal support therefor which is outboard of the first pivotal support, stop means on the stand to limit movement of the link by the davit arm at the operating position of the second pivotal support for the arm, stop means to limit movement of the davit arm about said second pivotal support, a braking element on the davit arm, and launching tackle including a rope engaged by said braking element, whereby a high degree of control of the davit arm by the launching tackle is promoted.

7. A davit comprising a stand, a davit arm having a foot at its lower part, a fulcrum-rest on the stand for the heel of said foot, a link having one of its ends pivotally connected to the stand substantially concentric with said fulcrum-rest and having its other end pivotally connected to the toe of said foot, stop means on the stand to limit movement of the link by the davit arm when the latter is moved about its fulcrum-rest on the stand, stop means to limit subsequent movement of the davit arm about its pivotal support on the link and off the fulcrum-rest on the stand, and a launching tackle connected with said davit arm, whereby a high degree of control of the davit arm by the launching tackle is promoted.

8. A gravity davit comprising a stand, a davit arm, a rigid link, at least two fulcrum devices about which the davit arm pivots successively, said link having its lower outboard end pivotally connected by the lower of said fulcrum devices to the arm and its upper inboard end pivotally connected by the upper of said fulcrum devices to the davit stand, and arresting means connected with the davit arm, the rigid link and the stand for limiting the downward and inboard movement of the lower fulcrum device with the davit arm about the upper fulcrum device and for subsequently limiting the further outboard movement of the davit arm about the lower fulcrum device, the combined mass of the davit arm and link having its center of gravity outboard of the upper fulcrum device and the mass of the davit arm having its center of gravity outboard of the lower fulcrum device when said lower fulcrum device is in its lowest position.

WILLIAM CAMERON ROUSE.
WILLIAM EDWARD MORLEY.

REFERENCES CITED

The following references are of record in the file of this patent:

UNITED STATES PATENTS

| Number | Name | Date |
| --- | --- | --- |
| 2,041,817 | Carr | May 26, 1936 |

FOREIGN PATENTS

| Number | Country | Date |
| --- | --- | --- |
| 101,685 | Sweden | Mar. 27, 1941 |
| 220,972 | Great Britain | Aug. 26, 1924 |